Figure 1:
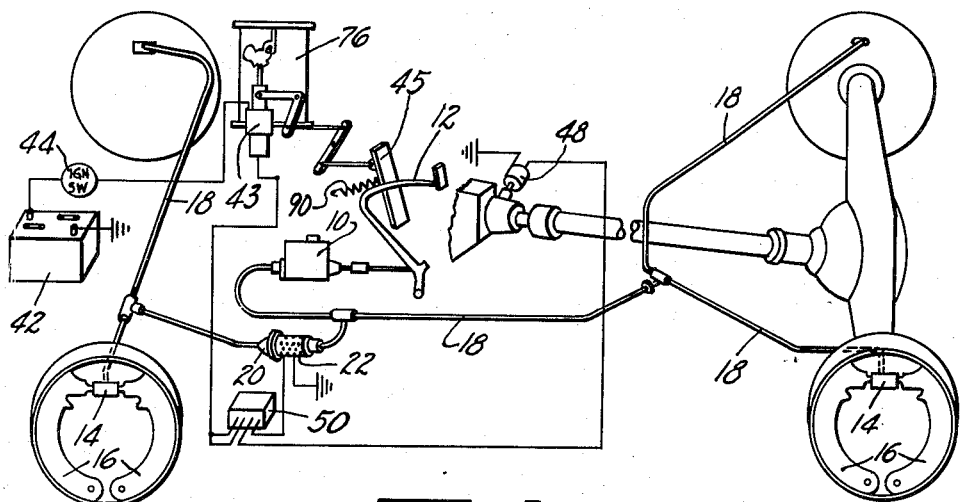

Aug. 26, 1958     R. H. LONG     2,849,557

ANTI-CREEP ACCELERATOR SWITCH

Filed Oct. 11, 1954     2 Sheets-Sheet 1

INVENTOR.
RICHARD H. LONG
BY
*H. C. Clayton*
ATTORNEY

Aug. 26, 1958     R. H. LONG     2,849,557
ANTI-CREEP ACCELERATOR SWITCH
Filed Oct. 11, 1954     2 Sheets-Sheet 2
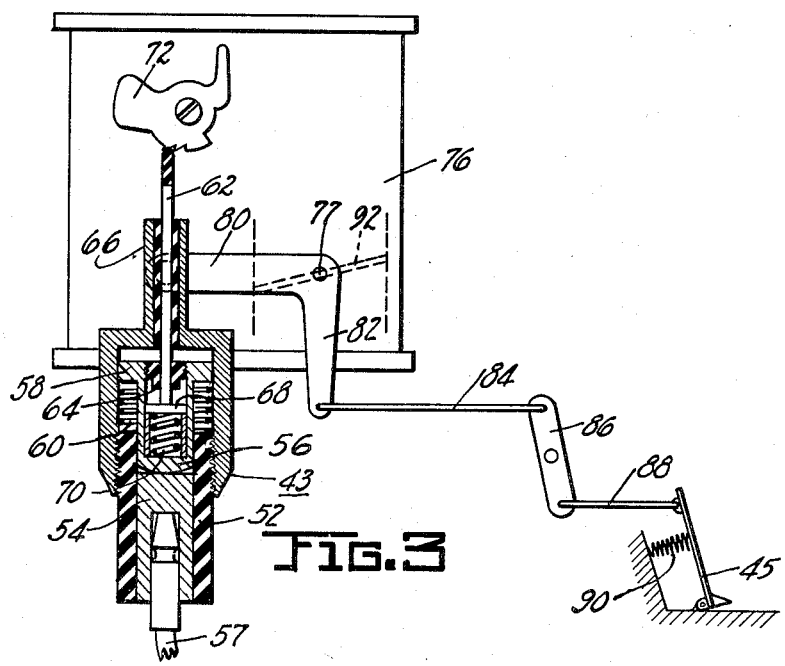
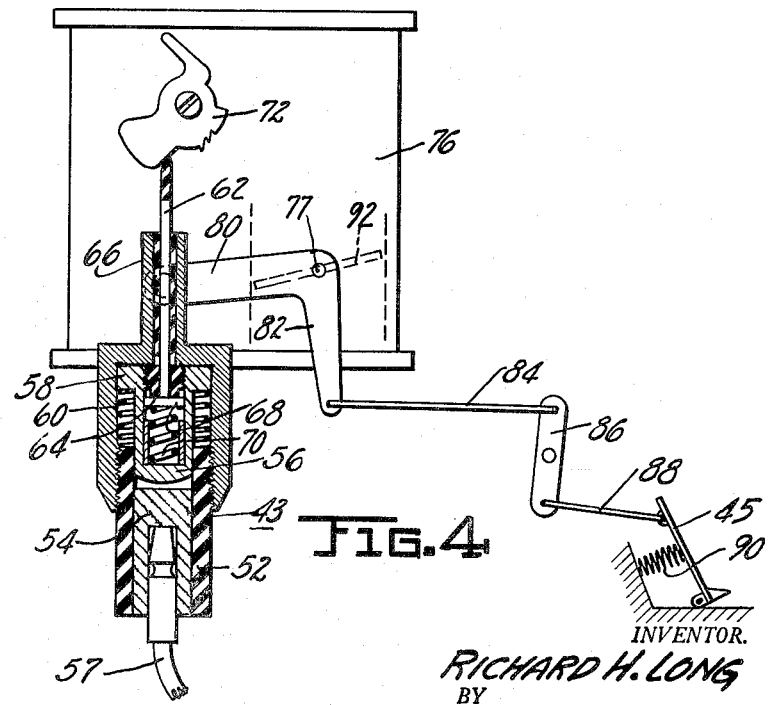
INVENTOR.
RICHARD H. LONG
BY
H. O. Clayton
ATTORNEY

United States Patent Office 2,849,557
Patented Aug. 26, 1958

2,849,557

ANTI-CREEP ACCELERATOR SWITCH

Richard H. Long, South Bend, Ind., assignor to Bendix Aviation Corporation, South Bend, Ind., a corporation of Delaware Application October 11, 1954, Serial No. 461,621

3 Claims. (Cl. 200—61.9)

This invention relates in general to brake mechanism and more particularly to an anti-creep mechanism for controlling the brake mechanism of an automotive vehicle.

Referring to the prior art there is disclosed in Price Patent No. 2,642,484 a vehicular brake anti-creep mechanism wherein a control switch is closed when the accelerator of the vehicle is in its released position. Then when the driver depresses the accelerator to get the vehicle under way this switch is immediately opened thereby rendering the anti-creep mechanism inoperative. Now this and similar anti-creep mechanism of the prior art are to a degree objectionable inasmuch as the driver, with the car stopped at say a traffic light, will probably rest his foot on the accelerator thereby, by its weight, probably opening the throttle a few degrees and also inadvertently opening the aforementioned control switch; and this operation will disable the brake anti-creep mechanism at the very time this mechanism should be operative to maintain the brakes applied.

It is accordingly an object of my invention to obviate the aforementioned undesirable feature by including in this particular anti-creep brake control mechanism, or any other brake mechanism including a manually actuated power controlling and switch controlling member, a manually and power operated switch mechanism operable, despite a small increment of opening movement of said member, to maintain the mechanism operable for the purpose intended, that is to maintain the mechanism energized to hold the brakes applied.

A further object of my invention is to provide, in a mechanism such as an automotive vehicle or a stamping press, a brake mechanism operable when a manually and power operated member is reluctant to hold the brake mechanism applied, a power controlling member, means, including a switch for controlling the operation of the mechanism and means interconnecting the manually and power operated member, the throttle and the switch; said means, including operable means, being so constructed that a slight depression, that is throttle opening movement, of the manually and power operated member will open the throttle but will not disable the brake mechanism on its operation of holding the brakes applied.

Figure 2:
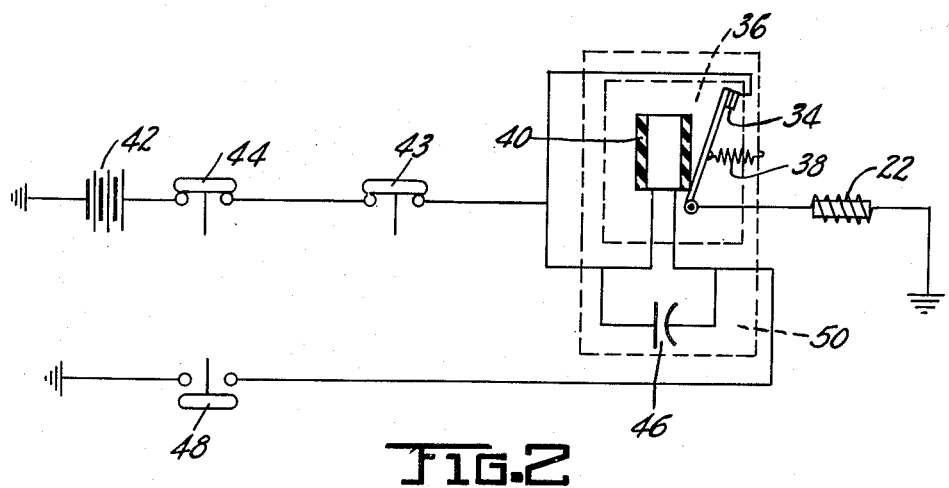

Other objects and advantages of the present invention will become apparent during the following description of an illustrative embodiment of the invention, reference being made therein to the accompanying drawings, in which:

Figure 1 is a diagrammatic view disclosing one embodiment of my invention employed as a part of the anti-creep mechanism of an automotive vehicle;

Figure 2 discloses the electrical hookup of the mechanism of Figure 1;

Figure 3 is a sectional view disclosing the details of the manually and power operated switch mechanism of my invention, the switch being shown in its closed position; and Figure 4 is a sectional view of said switch mechanism, the switch being shown in its open position.

There is disclosed in Figures 1 and 2 a preferred embodiment of my invention wherein my switch controlling mechanism is employed to control a well known type of brake mechanism of an automotive vehicle said mechanism including an anti-creep mechanism. This brake and anti-creep mechanism, no claim to which is made, includes a master cylinder 10 housing a piston, not shown, which is actuated as a result of the manual operation of a brake pedal 12. Depression of the brake pedal to apply the brakes energizes slave cylinders 14 which in turn actuate the brake shoes 16 of the wheel brakes of the vehicle. In this operation an incompressible or substantially incompressible brake fluid flows through conduits 18 and upon release of the brake pedal a certain mechanism including return springs, not shown, operates to return the parts of the mechanism to their brake off positions.

Briefly describing features of the anti-creep mechanism of Figure 1 a solenoid operated check valve 20, preferably inserted in the system to control the front brakes of the vehicle, operates, with a release of the brake pedal and after the energization of a grounded solenoid 22, to trap the brake fluid between the slave cylinders and said valve, thereby holding the brakes in their applied position; however, said solenoid when deenergized serves to disable this valve and thereby disable the anti-creep mechanism. This check valve and the solenoid for operating the same are disclosed in the aforementioned Patent Number 2,642,484 and are not claimed herein.

In certain cars of the day the solenoid 22 is energized and deenergized, to operate the anti-creep portion of the brake mechanism, with an operation of an accelerator operated switch and a vehicle speed responsive governor operated switch; however, as stated above in the objects of my invention this accelerator operated switch is somewhat uncertain in operation particularly as to its operation with the driver's foot resting thereon. Accordingly there is provided, by the instant invention, an efficient and effective means for controlling the operation of an accelerator operated switch mechanism; and said control means may, as disclosed in Figures 1 and 2, cooperate with the aforementioned vehicle speed responsive governor operated control switch to provide, by the whole, the desired control means.

Describing now the switch control means of Figures 1 and 2 there is provided a normally closed switch 34 of a relay 36; and this switch is preferably biased to its closed position by a spring 38. The coil 40 of the relay is electrically connected in series with a grounded battery 42, the ignition switch 44 of the vehicle, a switch 43 operated by the accelerator 45 of the vehicle, said switching constituting the essence of my invention, and a grounded vehicle speed responsive breaker switch 48 which is opened when the car is brought to a stop. There is provided a condenser 46 which is electrically connected in parallel with the relay coil 40 in the aforementioned electrical circuit. The relay 36 and condenser 46 may be housed within one container indicated by the reference numeral 50 in Figures 1 and 2.

The parts of the mechanism of Figure 1, particularly the condenser 46 and the rate of charge thereof, are preferably so constructed and arranged and so operative that the anti-creep mechanism is rendered operative at the beginning of a certain period of time before the vehicle comes to a stop; or the parts of the mechanism may be constructed and arranged and operative to effect an operation of the anti-creep mechanism at the end of a certain period of time after the vehicle comes to a stop. An inspection of the electrical hookup of Figure 2 reveals the operation of the mechanism to effect either one of these results inasmuch as the condenser 46 is electrically connected in parallel with the relay coil 40. As to the four-wheel brake mechanism of Figure 1 it is to be particularly noted that the anti-creep portion of this mechanism is operative to control only the two front wheel brakes and that the means for controlling the anti-creep mechanism, including the condenser 46, is responsive to the speed of rotation of the two rear wheels of the vehicle.

As to the remainder of the electrical circuit for controlling the operation of the solenoid 22 of the anti-creep mechanism said circuit includes, in series with said solenoid, the normally closed relay switch 34, the accelerator operated breaker switch 43 constituting the most important feature of my invention, the ignition switch 44, and the grounded battery 42.

The anti-creep mechanism of my invention is rendered inoperative so long as the car is in motion above a relatively low vehicle speed; this for the reason that the relay switch 34 is held open by an operation of the coil 40 thereby rendering the check valve 20 inoperative to trap the brake fluid in the slave cylinder. However at the end of a certain period of time after the car is brought to a stop, that is the period during which the condenser 46 is in its process of discharging, the switch 34 is automatically closed by an operation of the spring 38 thereby effecting an energization of the solenoid 22 to render the anti-creep mechanism operative. However as indicated above the mechanism of Figures 1 and 2 may be adjusted to effect the initiation of the operation of the anti-creep mechanism at the beginning of a certain period of time before the car comes to a stop.

Describing now the accelerator operated switch 43, Figures 3 and 4, said switch includes a tubular shaped two part bodily movable casing 52, Figures 3 and 4, the lower section of which is of an insulating material; and a switch contact 54 is fixedly secured in the said section. An electrical conductor 57 is connected to the contact 54 and to the relay switch 34. A thimble shaped switch contact 56 is slidably mounted in the upper part of the casing 52, a flange 58 at the end of said contact slidably contacting the inner wall of said upper casing part. A relatively light spring 60, interposed between the flange 58 and one end of the lower casing part, serves, when expanded, to separate the switch contacts 54 and 56.

A stop 62 extends through insulation 64 secured to the flange 58, through an opening in the base of the casing and through an opening in an externally threaded stem 66 which extends outwardly from the body of the casing. Adjacent the inner end of the stop 62 there is provided a flange 68 which serves as an abutment for a relatively heavy spring 70 interposed between said flange and the bottom end of the thimble shaped contact 56. The spring 70 is heavier than the spring 60 and biases the contact 56 downwardly to close the switch as disclosed in Figure 3. The outer end of the stop 62 contacts an irregular shaped stop member 72 which constitutes a part of idle control mechanism of the carburetor 76 of the vehicle.

To the stem 66 there is connected the outer end of an arm 80 of a bell crank lever 82 the other arm of said bell crank being pivotally connected to one end of a rod 84; and the latter is pivotally connected at its other end to one end of a crank 86 which is pivotally mounted at its center upon a fixed pivot. The lower end of the crank 86 is pivotally connected by a rod 88, to the accelerator 45 of the vehicle; and the accelerator is biased, to its throttle closed position, by a compression return spring 90. The spring 90 is stronger than the spring 70. The butterfly or throttle valve 92 of the carburetor 76 is actuated by a shaft 77 which is rotated by the bell crank 82.

When the driver of the vehicle releases the accelerator to close both the throttle 92 and the switch 54, 56, the spring 90, acting as a power means, rotates the accelerator in a clockwise direction thereby moving the switch casing 52 upwardly, Figure 3. This operation serves, by virtue of the fact that the spring 60 is lighter than the spring 70, first to compress the relatively light spring 60 which is, at the initiation of this operation serving to keep the contact 56 spaced from the contact 54; and the compression of the spring 60 results in a closing of the switch. Continued upward movement of the valve casing, by the operation of the relatively heavy switch operating and accelerator return spring 90, serves, after the contacts 54 and 56 are brought to engagement with each other, to compress the relatively heavy spring 70; and it is to be remembered that during the entire release operation of the accelerator the throttle is being closed. At the close of this switch closing operation the parts of the switch operating means assume the position disclosed in Figure 3.

Describing the switch opening operation of the accelerator 45 a depression thereof serves, through the medium of the above described force transmitting means, to open the throttle 92 and at the same time move the switch casing 52 downwardly. In this operation the opening of the switch 54, 56 is delayed by virtue of the expansion of the spring 70 which, during the first throttle opening increment of movement of the accelerator, maintains the contacts 54 and 56 in engagement with each other. However, after the spring 70 has fully expanded the spring 60 comes into operation, that is expands, aided by the force exerted by the driver in depressing the accelerator to separate the contacts 54 and 56 that is open the switch.

It is important to note that the weight of the driver's foot on the accelerator may, and probably will, overcome the spring 90 sufficiently to open the throttle 92 a slight amount; however this weight will probably not be sufficient to compress said spring enough to effect an opening of the switch 54, 56; and an opening of the latter would of course result in an undesirable release of the brakes controlled at the time by the anti-creep mechanism of my invention.

There is thus provided, by the mechanism of my invention, means for so interconnecting the accelerator, the throttle, and a control switch of the brake control mechanism that the operation of the latter to release the brakes is not effected by a slight throttle opening caused by the weight of the driver's foot on the accelerator. It is also to be noted that the automotive brake mechanism or its equivalent described herein may be applied to other machines such as a stamping machine. With such a machine it is desirable to employ a small and inexpensive brake to maintain a relatively massive fly wheel or equivalent part of the mechanism static; and my invention finds utilization in such a mechanism inasmuch as with the above described mechanism it is undesirable to render the brake holding mechanism inoperative with a slight opening of the throttle of the vehicle caused by the weight of the hand or foot of the operator on the controls.

I claim:

1. A switch mechanism including in combination, a movable casing, a switch contact fixedly secured to said casing, a stop member having a portion thereof housed within the casing, a second switch contact slidably mounted within the casing, a spring interposed between the stop member and the second switch contact and biasing said contact into engagement with the first mentioned contact, and a spring interposed between the casing and the latter switch contact said spring biasing the two contacts out of engagement with each other.

2. An electrical switch mechanism comprising: a body member having a longitudinal opening therethrough which is enlarged at one end, a tubular member made from insulating material projecting into said end of said body member, a first electrical contact fixed in said tubular member, a second movable contact for abutment with said first contact and having one end slidably received in said body member and a second end slidably received in said tubular member, a first spring positioned between said movable contact and the end of said tubular member for biasing said contacts apart, said second contact having an internal chamber therein communicating with said longitudinal opening in said body member on its side opposite said first contact, an abutment member one end of which is positioned in said internal chamber of said movable contact and the other end of which projects out of said longitudinal opening in said body member, and a second spring interpositioned between said abutment member and said movable contact, said second spring being stronger than said first spring.

3. An electrical switch mechanism comprising: a metallic body member having a longitudinal opening therethrough which is enlarged and threaded at one end, a tubular member made from insulating material screwed into said end of said body member, a first electrical contact fixed in the outer end of said tubular member, a second movable contact for abutment with said first contact and having one end slidably received in said body member and a second end slidably received in said tubular member, a first spring positioned between said movable contact and the end of said tubular member for biasing said contacts apart, said second contact having an internal chamber therein communicating with said longitudinal opening in said body member on its side opposite said first contact, an abutment member one end of which is positioned in said internal chamber of said movable contact and the other end of which projects out of said longitudinal opening in said body member, and a second spring interpositioned between said abutment member and said movable contact, said second spring being stronger than said first spring.

References Cited in the file of this patent
UNITED STATES PATENTS

| | | |
|---|---|---|
| 1,724,568 | Durning et al. | Aug. 13, 1929 |
| 1,729,364 | Schwier et al. | Sept. 24, 1929 |
| 2,130,706 | Salmond | Sept. 20, 1938 |
| 2,152,256 | Hewitt | Mar. 28, 1939 |
| 2,297,692 | Chambers | Oct. 6, 1942 |
| 2,308,822 | Murphy | Jan. 19, 1943 |
| 2,400,278 | Wisely | May 14, 1946 |
| 2,562,420 | Furnas | July 31, 1951 |